US012624731B2

(12) United States Patent
Ke et al.

(10) Patent No.: US 12,624,731 B2
(45) Date of Patent: May 12, 2026

(54) HYDROSTATIC GAS BEARING CONFIGURED TO REMOVE HUMIDITY BY HEAT EXCHANGING

(71) Applicant: Wuhan Second Ship Design and Research Institute, Hubei (CN)

(72) Inventors: Zhiwu Ke, Hubei (CN); Yuansheng Lin, Hubei (CN); Zhenxing Zhao, Hubei (CN); Hanbing Ke, Hubei (CN); Can Ma, Hubei (CN); Wei Wang, Hubei (CN); Bangming Li, Hubei (CN); Lu Dai, Hubei (CN); Tao He, Hubei (CN); Guangming Cao, Hubei (CN); Jinlan Gou, Hubei (CN)

(73) Assignee: Wuhan Second Ship Design and Research Institute, Wuhan (CN)

( * ) Notice: Subject to any disclaimer, the term of this patent is extended or adjusted under 35 U.S.C. 154(b) by 48 days.

(21) Appl. No.: 18/926,897

(22) Filed: Oct. 25, 2024

(65) Prior Publication Data

US 2025/0198458 A1 Jun. 19, 2025

(30) Foreign Application Priority Data

Dec. 14, 2023 (CN) .......................... 202311725141.5

(51) Int. Cl.
*F16C 37/00* (2006.01)
*F16C 32/06* (2006.01)
(52) U.S. Cl.
CPC ........ *F16C 37/002* (2013.01); *F16C 32/0618* (2013.01)
(58) Field of Classification Search
CPC .............. F16C 32/0603; F16C 32/0607; F16C 32/0614; F16C 32/0618; F16C 32/0662; F16C 32/0685; F16C 37/00; F16C 37/002
See application file for complete search history.

(56) References Cited

U.S. PATENT DOCUMENTS

| | | | | | |
|---|---|---|---|---|---|
| 9,784,312 | B1 * | 10/2017 | Gu | ...................... | F16C 32/0685 |
| 2019/0376555 | A1 * | 12/2019 | Jeung | .................. | F16C 33/1005 |
| 2019/0376556 | A1 * | 12/2019 | Jeung | ...................... | F25B 31/00 |

FOREIGN PATENT DOCUMENTS

| | | |
|---|---|---|
| CN | 105805160 A | 7/2016 |
| CN | 110848259 A | 2/2020 |

(Continued)

OTHER PUBLICATIONS

Chinese Office Action from Corresponding Chinese Patent Application No. CN202311725141.5, Jun. 19, 2024.

(Continued)

*Primary Examiner* — Alan B Waits

(57) ABSTRACT

A hydrostatic gas bearing is provided that is configured to remove humidity by heat exchanging, including a bearing seat, a rotary shaft, an annular throttling component, and a plurality of heat exchanging tubes. A cavity is provided inside the bearing seat and an inlet pipe is provided on an outer surface of the bearing seat. The annular throttling component is sleeved on the outside of the rotary shaft with a first gap provided between the annular throttling component and the rotary shaft. The first gap goes through the bearing seat to form an exhaust channel therein, and the annular throttling component is configured to throttle and cool a working medium. The plurality of heat exchanging tubes are provided in the annular throttling component, with heat exchanging medium flowing therein, which is configured to heat and vaporize a part of an in-liquid phase in a cooled portion of the working medium.

10 Claims, 2 Drawing Sheets

(56)      References Cited

FOREIGN PATENT DOCUMENTS

| CN | 216554974 | U | 5/2022 |
| CN | 115111014 | A | 9/2022 |
| CN | 116877577 | A | 10/2023 |
| JP | H06307448 | A | 11/1994 |
| RU | 2229344 | C2 | 5/2004 |

OTHER PUBLICATIONS

Chinese Notice of Allowance from Corresponding Chinese Patent Application No. CN202311725141.5, Sep. 13, 2024.

* cited by examiner

HYDROSTATIC GAS BEARING CONFIGURED TO REMOVE HUMIDITY BY HEAT EXCHANGING

CROSS-REFERENCE TO RELATED DISCLOSURES

This disclosure claims priority to Chinese Patent Application No. 2023117251415, filed on Dec. 14, 2023, entitled "Hydrostatic Gas Bearing Configured to Remove Humidity by Heat Exchanging", which is hereby incorporated by reference in its entirety.

TECHNICAL FIELD

The present disclosure relates to the field of bearing, specifically to a hydrostatic gas bearing configured to remove humidity by heat exchanging.

BACKGROUND

Bearings are one of the key components of power machinery. Hydrostatic gas bearings have a strong capacity in bearing loads and may use high-pressure gas internally from a power system as the working medium of bearing. The working medium is more compatible with the system, and compared to traditional oil-lubricated bearings, the need for an oil supply system may be eliminated, losses due to friction in bearing may be reduced, and the power system may be simplified with energy efficiency improved. In some power systems, such as a steam system of nuclear power plants, steam may liquefy to form water droplets during throttling expansion. When such working media are used as the gas supply for hydrostatic gas bearings, gas pressure and temperature decrease during throttling in the hydrostatic gas bearing and thus the gas may be liquefied, so that a two-phase mixture of gas and liquid may enter bearing clearance, and it is difficult for the bearing to operate reliably.

BRIEF SUMMARY

The present disclosure provides a hydrostatic gas bearing configured to remove humidity by heat exchanging to address problems in the prior art where two-phase mixtures of gas and liquid liquefy to form water droplets during throttling expansion, so that it is difficult for the bearing to operate reliably.

The present disclosure provides a hydrostatic gas bearing configured to remove humidity by heat exchanging, including: a bearing seat, a cavity is provided inside the bearing seat and an inlet pipe is provided on an outer surface of the bearing seat and communicates with the cavity; a rotary shaft, passing through the bearing seat; an annular throttling component, sleeved on the outside of the rotary shaft and provided inside the cavity, with a first gap provided between the annular throttling component and the rotary shaft, the first gap passing through the bearing seat to form an exhaust channel. The annular throttling component is configured to throttle and cool a medium. A plurality of heat exchanging tubes, provided in the annular throttling component, arranged circularly along circumference of the annular throttling component. The heat exchanging tube is provided with a heat exchanging medium flowing therein, which is configured to heat and vaporize a part of an in-liquid phase in a cooled portion of the working medium.

According to the hydrostatic gas bearing configured to remove humidity by heat exchanging provided in this disclosure, the annular throttling component is made of a material with a porous structure.

In the hydrostatic gas bearing configured to remove humidity by heat exchanging provided in this disclosure, the annular throttling component is made of a material with a porous structure.

In the hydrostatic gas bearing configured to remove humidity by heat exchanging provided in this disclosure, the annular throttling component is provided with a plurality of first via holes on walls, the plurality of first via holes are configured to perform throttling and cooling on the medium.

In the hydrostatic gas bearing configured to remove humidity by heat exchanging provided in this disclosure, the annular throttling component is a non-metallic annular throttling component.

In the hydrostatic gas bearing configured to remove humidity by heat exchanging provided in this disclosure, a plurality of heat exchanging tubes are arranged circularly along circumference of the annular throttling component, to form heat exchanging layers. The heat exchanging layers are multiple layers, with a gap between adjacent layers.

In the hydrostatic gas bearing configured to remove humidity by heat exchanging provided in this disclosure, a temperature of heat exchanging medium in a heat exchanging layer adjacent to the first gap is higher than a temperature of heat exchanging medium in other heat exchanging layers.

The hydrostatic gas bearing configured to remove humidity by heat exchanging provided in this disclosure further includes: a first pipeline communicating with first ends of the heat exchanging layers, and configured to inject the heat exchanging medium; a second pipeline communicating with second ends of the heat exchanging layers, and configured to discharge the heat exchanging medium.

In the hydrostatic gas bearing configured to remove humidity by heat exchanging provided in this disclosure, the bearing seat includes an annular member and a pair of end caps. The pair of end caps are respectively provided at both ends of the annular member. Each of the end caps is provided with a second via hole, through which the rotary shaft is disposed. A diameter of the second via hole is larger than a diameter of the rotary shaft, so that the exhaust channel is provided therein. The first and second pipelines go through the end caps and extend beyond the end caps.

The hydrostatic gas bearing configured to remove humidity by heat exchanging provided in this disclosure further includes: a pair of sealing plates, provided at both end of the annular throttling component respectively. Both ends of the heat exchanging tubes go through the sealing plates respectively and communicate with the first pipeline or the second pipeline. Each sealing plate is provided with a third via hole, and a diameter of the third via hole is equal to a diameter of the second through hole.

In the hydrostatic gas bearing configured to remove humidity by heat exchanging provided in this disclosure, a second gap is formed between the annular throttling component and an inner wall of the bearing seat, to form an inlet channel which communicates with the inlet pipe.

The hydrostatic gas bearing configured to remove humidity by heat exchanging provided in this disclosure may decrease the temperature and pressure of the medium utilizing a throttling effect with the annular throttling component and the plurality of heat exchanging tubes, and vaporize a part of an in-liquid phase in the working medium to be in gas phase by the heat exchanging tubes, so that liquid can be prevented from entering the first gap during operation of a hydrostatic gas bearing, which would otherwise lead to unstable operation of the hydrostatic gas bearing, and the operation reliability of the hydrostatic gas bearing may be improved.

BRIEF DESCRIPTION OF THE DRAWINGS

For better clarification of the technical solutions in the embodiments or the prior art, brief introduction is made below on the drawings used in explaining the embodiments or the prior art. It is obvious that the drawings in the following description are only some embodiments of the present disclosure. For one skilled in the art, other drawings are obtainable based on these drawings without creative effort.

DETAILED DESCRIPTION

To better clarify objectives, technical solutions, and advantages of the present disclosure, technical solutions in the present disclosure will be clearly and thoroughly described below in conjunction with the drawings. It is obvious that the described embodiments are some of the embodiments of the present disclosure, but not all of them. Based on the embodiments of the present disclosure, all other embodiments obtained by one or ordinary skill in the art without creative efforts shall fall within the scope of the present disclosure.

The terms "first" and "second" in the specification and claims of the present disclosure may explicitly or implicitly include one or more of such features. In the description of the present disclosure, unless otherwise specified, the term "a plurality of" or "a plurality of" means two or more.

The hydrostatic gas bearing configured to remove humidity by heat exchanging of the present disclosure is described below in conjunction with FIGS. 1 and 2.

Figure 1:
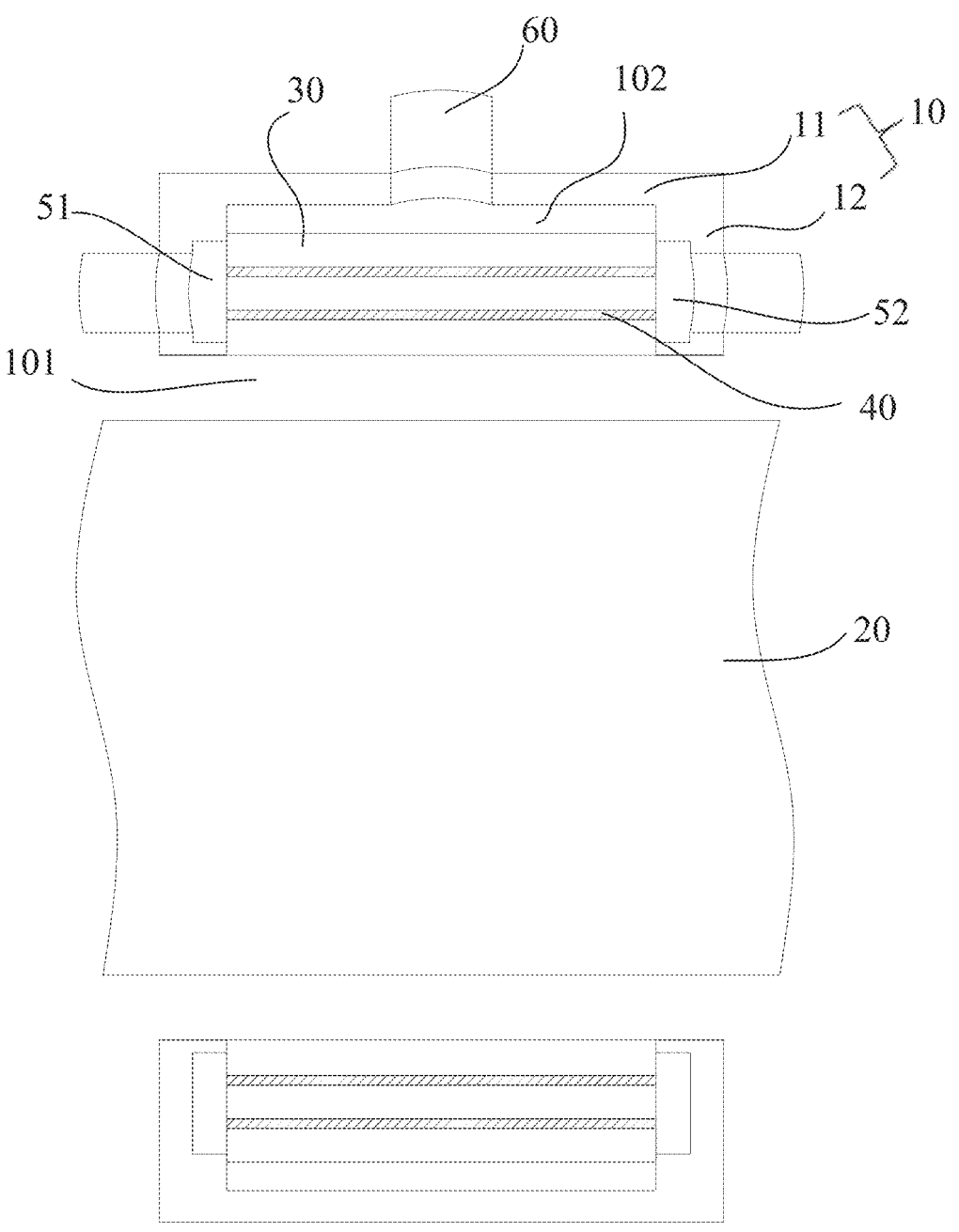
FIG. 1 is a schematic structural diagram of the hydrostatic gas bearing configured to remove humidity by heat exchanging provided by the present disclosure.

As shown in FIG. 1, an embodiment of the present disclosure provides a hydrostatic gas bearing configured to remove humidity by heat exchanging, including: a bearing seat 10, a rotary shaft 20, an annular throttling component 30, and a plurality of heat exchanging tubes 40. A cavity is provided inside the bearing seat 10 and an inlet pipe 60 is provided on an outer surface of the bearing seat 10 and communicates with the cavity. The rotary shaft 20 passes through the bearing seat 10. The annular throttling component 30 is sleeved on the outside of the rotary shaft 20 and provided inside the cavity. A first gap 10 is provided between the annular throttling component and the annular throttling component 30. The first gap 101 passes through the bearing seat 10 to form an exhaust channel. The annular throttling component 30 is configured to throttle and cool the working medium. The plurality of heat exchanging tubes 40 are provided inside of the annular throttling component 30 and arranged circularly along circumference of the annular throttling component 30. The heat exchanging tubes 40 are provided with heat exchanging medium flowing therein, and the heat exchanging medium may be configured to heat and vaporize a part of the in-liquid phase in a cooled portion of the working medium.

Specifically, in the embodiments of the present disclosure, the inlet pipe 60 may be in plural. The plurality of inlet pipes 60 may be arranged circularly along circumference of the bearing seat 10. The inlet pipe 60 may be configured to transport the working medium into the cavity of the bearing seat 10. In the present embodiment, the working medium is a gas-phase working medium that is easily liquefied or a working medium in two phases of liquid and gas. When the working medium passes by the annular throttling component 30, a throttling effect is generated so that the pressure and temperature of the working medium may be decreased, and the part of the in-gas phase in the working medium may be liquefied to be in liquid phase. Then, the working medium may pass by the heat exchanging tubes 40, and the heat exchanging medium in the heat exchanging tubes 40 may have a temperature higher than a temperature of the working medium and may heat the working medium by heat exchanging with the working medium to vaporize a part of the in-liquid phase in the working medium to be in a gas phase, and the working medium may pass by the annular throttling component 30 again and the pressure and temperature of the working medium may be decreased but there is no liquefaction happened. At this time, the working medium may be totally a working medium in a gas state, which may be discharged through the first gap 101 between the annular throttling component 30 and the rotary shaft 20, so that liquid can be prevented from entering the first gap 101 of a hydrostatic gas bearing, which would otherwise lead to unstable operation of the hydrostatic gas bearing.

Furthermore, in this embodiment, the annular throttling component 30 is configured to reduce the pressure and temperature of the high-temperature and high-pressure working medium entering the bearing seat 10, so that the pressure of the working medium meets a design requirement of the hydrostatic gas bearing. The temperature of the heat exchanging medium in the heat exchanging tubes 40 may be as high as possible, so that the part of the in-liquid phase in the working medium is completely vaporized into gas, and the working medium may have a lower temperature and pressure reduced after the working medium passes through the annular throttling component 30 without liquefaction incurred, so as to prevent liquid from being generated in the working medium.

Optionally, in the embodiments of the present disclosure, the heat exchanging medium may be gas with high temperature. In the present embodiment, the heat exchanging medium may be the working medium of hydrostatic gas bearing, which may be in a high temperature and a high pressure in an initial state as character thereof, so that a cooled portion of the working medium may be vaporized by such heat exchanging medium to be in a gas state without requiring additional heat exchanging medium to be provided and the energy consumption may be reduced.

The hydrostatic gas bearing configured to remove humidity by heat exchanging provided in the embodiments of the present disclosure may decrease the temperature and pressure of the medium utilizing a throttling effect with the annular throttling component and the plurality of heat exchanging tubes, and vaporize a part of the in-liquid phase in the working medium to be in gas phase by the heat exchanging tubes, so that liquid can be prevented from entering the first gap during operation of a hydrostatic gas bearing, which would otherwise lead to unstable operation of the hydrostatic gas bearing, and the operation reliability of the hydrostatic gas bearing may be improved.

As shown in FIG. 1, in the embodiment of the present disclosure, annular throttling component 30 is made of a porous material, specifically a relatively loose material with micro pores. When the working medium passes through the micro pores, the micro pores may perform throttling effect on the working medium to decrease the pressure and temperature of the working medium. During such process, part of the in-gas phase in the working medium may be liquefied. Optionally, the porous material may be porous ceramics, carbon materials, etc.

Optionally, in another embodiment of the present disclosure, the annular throttling component 30 may be provided with a plurality of first via holes on the wall thereof. Specifically, in the present embodiment, the annular throttling component 30 may also be an annular component with many micro via holes on its wall. These micro via holes may increase the flow resistance on the working medium, so that a throttling effect may be achieved to reduce the temperature and pressure of the working medium.

Furthermore, in the embodiment of the present disclosure, the annular throttling component 30 is preferably a non-metallic annular throttling component. Non-metallic throttling elements have poor thermal conductivity, and when the heat exchanging tubes 40 conduct heat exchanging with a working medium, the annular throttling component 30 may effectively perform cooling and reduce pressure due to their poor thermal conductivity.

As shown in FIG. 1, in the embodiment of the present disclosure, a plurality of heat exchanging tubes 40 are arranged circularly along circumference of the annular throttling component 30. to form heat exchanging layers, and the heat exchanging layers may be in plural with gaps between adjacent layers.

More particularly, a plurality of heat exchanging layers may be provided inside the annular throttling component 30, with gaps between adjacent heat exchanging layers, so as to form a structure in which throttling layers and heat exchanging layers stacked alternatively. Each throttling layer may be configured to reduce the temperature and pressure of the working medium, and each heat exchanging layer may be configured to heat the cooled portion of the working medium to vaporize the part of the in-liquid phase into gas, and the working medium can become a working medium totally in gas after passing through each heat exchanging layer. In the present embodiment, a plurality of throttling layers may reduce the pressure of the working medium to meet design requirements of the hydrostatic gas bearing, and a plurality of heat exchanging layers may ensure that the working medium entered into the first gap 101 is a working medium totally in gas, and stable operation of the hydrostatic gas bearing can be ensured.

Furthermore, in the embodiment of the present disclosure, the number, material, and size of the heat exchanging tubes 40 in each heat exchanging layer may be configured according to the specific parameters of the hydrostatic gas bearing.

In the hydrostatic gas bearing configured to remove humidity by heat exchanging provided by the embodiment of the present disclosure, a plurality of heat exchanging layers are provided inside the annular throttling component, and a structure in which a plurality of throttling layers and a plurality of heat exchanging layers are stacked alternatively is formed in the annular throttling component, so that the working medium undergoes cooling and pressure reduction for multi-times during flowing, and a normal pressure of the hydrostatic gas bearing may be ensured without the impact on the lifespan of the hydrostatic gas bearing from excessively high temperatures of local parts of the hydrostatic gas bearing. All parts of the in-liquid phase in the working medium may be vaporized to be in a gas phase after the working medium passes through each heat exchanging layer, so that the working medium is totally in gas phase, and thus liquid is prevented from entering the first gap of the hydrostatic gas bearing. The operation reliability of the hydrostatic gas bearing may be ensured.

As shown in FIG. 1, in the embodiment of the present disclosure, the hydrostatic gas bearing configured to remove humidity by heat exchanging further includes a first pipeline 51 and a second pipeline 52. The first pipeline 51 may be in communication with first ends of the plurality of the heat exchanging layers, and configured to inject the heat exchanging medium into the heat exchanging layers. The second pipeline 52 may be in communication with second ends of the plurality of heat exchanging layers, and configured to discharge the heat exchanging medium from the heat exchanging layers.

More particularly, the first pipeline 51 communicates with the first end of each layer of the heat exchanging tubes 40, and the second pipeline 52 communicates with the second end of each layer of the heat exchanging tubes 40. The heat exchanging medium enters each layer of the heat exchanging tubes 40 through the first pipeline 51, and is discharged through the second pipeline 52 after heat exchanging with the working medium.

In the embodiment of the present disclosure, a temperature of the heat exchanging medium in a heat exchanging layer adjacent to the first gap 101 may be higher than a temperature of the heat exchanging medium in other heat exchanging layers.

More particularly, in the embodiment shown in FIG. 1, the number of heat exchanging layers is two, and the number of throttling layers is three. A heat exchanging layer far from the first gap 101 may be the first heat exchanging layer, and a heat exchanging layer close to the first gap 101 may be the second heat exchanging layer. In the present embodiment, a temperature of the heat exchanging medium inside the heat exchanging tubes 40 of both the first and second heat exchanging layers may be higher than a temperature of a cooled portion of the working medium, so as to vaporize a part of the in-liquid phase of the working medium to be in a gas phase after heating the working medium. The working medium may be further cooled and depressurized through the throttling layer after passing through the second heat exchanging layer. Therefore, the temperature of the heat exchanging medium inside each heat exchanging tube 40 in the second heat exchanging layer should be as high as possible to ensure that the working medium may maintain a total gas state after passing through the last throttling layer, so that liquid may be prevented from existing in the working medium.

Furthermore, in the present embodiment, the hydrostatic gas bearing configured to remove humidity by heat exchanging may further include two pairs of first pipelines 51 and second pipelines 52. One pair of first and second pipelines 52 may communicate with both ends of the first heat exchanging layer, and the other pair of first and second pipelines 52 may communicate with both ends of the second heat exchanging layer, so that the temperature of the heat exchanging medium into the first and second heat exchanging layers may be different.

As shown in FIG. 1, in the embodiment of the present disclosure, a second gap 102 may be formed between the annular throttling component 30 and the inner wall of the bearing seat 10, and the second gap 102 may form an inlet channel that communicates with the inlet pipe 60.

More particularly, as shown in FIG. 1, in the embodiment of the present disclosure, the bearing seat 10 may include: an annular member 11 and a pair of end caps 12. The pair of end caps 12 are respectively provided at both ends of the annular member 11. Each of the end caps 12 may be provided with a second via hole, and the rotary shaft 20 may be disposed through the second via hole. A diameter of the second via hole may be larger than a diameter of the rotary shaft 20, so that an exhaust channel may be formed therein. The first pipeline 51 and the second pipeline 52 may go through the end caps 12 and extend beyond the end caps 12.

More particularly, the pair of end caps 12 are respectively provided at both ends of the annular member 11, so that a cavity may be provided inside the bearing seat 10. The annular throttling component 30 may be provided in the cavity. A second gap 102 may be formed between the annular throttling component 30 and the annular member 11 and the second gap 102 may form an inlet channel. A diameter of a center hole in the annular throttling component 30 is equal to that of the second via hole of the end cap 12, so that a discharge via hole may be formed through the bearing seat 10. The first pipeline 51 and the second pipeline 52 may go through the end caps 12 and extend beyond the end caps 12.

Figure 2:
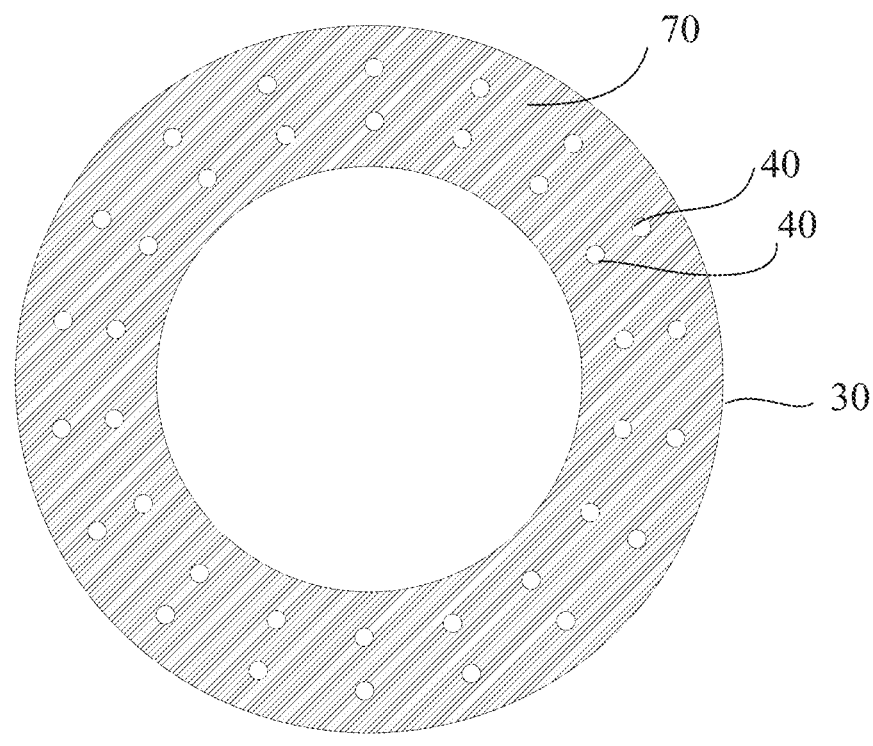
FIG. 2 is a side view of the heat exchanging tube shown in FIG. 1.

Furthermore, as shown in FIG. 2, in the embodiment of the present disclosure, the hydrostatic gas bearing configured to remove humidity by heat exchanging may further include: a pair of sealing plates 70. The pair of sealing plates 60 may be provided at both end of the annular throttling component 30 respectively. Both ends of the heat exchanging tubes 40 may go through the sealing plates 70 respectively and communicate with the first pipeline 51 or the second pipeline 52. Each sealing plate 70 may be provided with a third via hole, and a diameter of the third via hole may be equal to the diameter of the second via hole.

More particularly, the annular throttling component 30 may be provided with a sealing plate 70 at each end thereof, and the sealing plate 70 may be configured to isolate the heat exchanging medium in the first pipeline 51 and the second pipeline 52 from the annular throttling component 30, so as to prevent the heat exchanging medium from penetrating into the annular throttling component 30 from the end of the annular throttling component 30 to heat the working medium, which may render the function of decreasing temperature and pressure by the annular throttling component 30 inoperative, when the heat exchanging medium enters the heat exchanging tube 40 or enters the second pipeline 52 from the heat exchanging tube 40.

The hydrostatic gas bearing configured to remove humidity by heat exchanging provided by the embodiment of the present disclosure has a simple structure for dehumidifying, with the original structure of the bearing fully used. The dehumidifying may be conducted automatically with the gas for heating supplied by the bearing during operation without additional heating devices, so that the manufacturing cost may be decreased. On the other hand, the hydrostatic gas bearing configured to remove humidity by heat exchanging provided by the embodiment of the present disclosure has a good dehumidification effect, with the maximum temperature of the working medium being controllable. The throttling and heating process of the working medium is divided into a plurality of stages, and the working medium may be cooled through the annular throttling component and then heated through the heat exchanging tubes in each stage. The overall heating area is large and the heating may be performed evenly, so that the part of the in-liquid phase of the working medium may be removed effectively. Moreover, in the entire process, the working medium undergoes a plurality of stages of cooling and heating, so that the impact on the service life of the bearing due to excessively high temperatures of local parts of the bearing may be avoided.

It should be noted that the above embodiments are only used to illustrate the technical solutions of the present disclosure, and not to limit them. Although the present disclosure has been described in detail with reference to the aforementioned embodiments, one skilled in the art should understand that modification may still be made on the technical solutions as described in the foregoing embodiments, or equivalent replacements may be made for some of the technical features. These modifications or replacements shall not drive the technical solutions corresponding thereto off the spirit and scope of the technical solutions of the embodiments of the present disclosure.

The invention claimed is:

1. A hydrostatic gas bearing configured to remove humidity by heat exchanging, comprising:
   a bearing seat, with a cavity provided inside the bearing seat, and with an inlet pipe that is provided on an outer surface of the bearing seat and communicates with the cavity;
   a rotary shaft, passing through the bearing seat;
   an annular throttling component that is sleeved outside of the rotary shaft and is provided inside the cavity, wherein a first gap is provided between the annular throttling component and the rotary shaft, and wherein the first gap passes through the bearing seat to form an exhaust channel, wherein the annular throttling component is configured to throttle and cool a working medium; and
   a plurality of heat exchanging tubes provided in the annular throttling component, the plurality of heat exchanging tubes being arranged circularly along a circumference of the annular throttling component, and the plurality of heat exchanging tubes being provided with a heat exchanging medium flowing therein, wherein the heat exchanging medium is configured to heat and vaporize a part of an in-liquid phase in a cooled portion of the working medium.

2. The hydrostatic gas bearing configured to remove humidity by heat exchanging according to claim 1, wherein the annular throttling component is made of a material having a porous structure.

3. The hydrostatic gas bearing configured to remove humidity by heat exchanging according to claim 1, wherein the annular throttling component is provided with a plurality of first via holes on walls thereof, the plurality of first via holes being configured to perform throttling and cooling on the working medium.

4. The hydrostatic gas bearing configured to remove humidity by heat exchanging according to claim 1, wherein the annular throttling component is a non-metallic annular throttling component.

5. The hydrostatic gas bearing configured to remove humidity by heat exchanging according to claim 1, wherein the plurality of heat exchanging tubes are arranged circularly along a circumference of the annular throttling component to form a plurality of heat exchanging layers, the heat exchanging layers being provided with a gap between adjacent layers.

6. The hydrostatic gas bearing configured to remove humidity by heat exchanging according to claim 5, wherein a temperature of the heat exchanging medium in a first heat exchanging layer of the plurality of heat exchanging layers adjacent to the first gap is higher than a temperature of the heat exchanging medium in other heat exchanging layers of the plurality of heat exchanging layers.

7. The hydrostatic gas bearing configured to remove humidity by heat exchanging according to claim 5, further comprising:

a first pipeline communicating with first ends of the heat exchanging layers, the first pipeline being configured to inject the heat exchanging medium;

a second pipeline communicating with second ends of the heat exchanging layers, the second pipeline being configured to discharge the heat exchanging medium.

8. The hydrostatic gas bearing configured to remove humidity by heat exchanging according to claim 7, wherein the bearing seat comprises an annular member and a pair of end caps, the pair of end caps being respectively provided at ends of the annular member, each of the end caps being provided with a second via hole through which the rotary shaft is disposed, a diameter of the second via hole being larger than a diameter of the rotary shaft such that an exhaust channel is provided therein; and wherein the first and second pipelines go through the end caps and extend beyond the end caps.

9. The hydrostatic gas bearing configured to remove humidity by heat exchanging according to claim 8, further comprising: a pair of sealing plates respectively provided at ends of the annular throttling component, wherein both ends of the heat exchanging tubes go through the sealing plates respectively and communicate with the first pipeline or the second pipeline, each sealing plate of the pair of sealing plates being provided with a third via hole, and wherein a diameter of the third via hole is equal to the diameter of the second via hole.

10. The hydrostatic gas bearing configured to remove humidity by heat exchanging according to claim 1, wherein a second gap is formed between the annular throttling component and an inner wall of the bearing seat, wherein the second gap forms an inlet channel which communicates with the inlet pipe.

\* \* \* \* \*